(12) United States Patent
Tatara

(10) Patent No.: US 11,678,424 B2
(45) Date of Patent: Jun. 13, 2023

(54) AUTONOMOUS DRIVING INDICATION SYSTEM AND VEHICLE COMMUNICATION SYSTEM

(71) Applicant: Koito Manufaturing Co., LTD., Tokyo (JP)

(72) Inventor: Naoki Tatara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 16/968,563

(22) PCT Filed: Feb. 6, 2019

(86) PCT No.: PCT/JP2019/004190
§ 371 (c)(1),
(2) Date: Aug. 7, 2020

(87) PCT Pub. No.: WO2019/156106
PCT Pub. Date: Aug. 15, 2019

(65) Prior Publication Data
US 2021/0043013 A1 Feb. 11, 2021

(30) Foreign Application Priority Data
Feb. 8, 2018 (JP) .............................. JP2018-020907
Feb. 8, 2018 (JP) .............................. JP2018-020933

(51) Int. Cl.
*H04N 5/44* (2011.01)
*H05B 47/17* (2020.01)
(Continued)

(52) U.S. Cl.
CPC ............... *H05B 47/17* (2020.01); *B60Q 1/18* (2013.01); *B60Q 1/46* (2013.01); *G07C 5/06* (2013.01); *G07C 5/0825* (2013.01)

(58) Field of Classification Search
CPC . H05B 47/17; B60Q 1/18; B60Q 1/46; B60Q 1/50; B60Q 2300/45; G07C 5/06; G07C 5/0825; F21V 23/00
See application file for complete search history.

(56) References Cited

U.S. PATENT DOCUMENTS 5,673,050 A * 9/1997 Moussally .......... G01S 13/0209
342/22
7,748,127 B1 * 7/2010 Cosimano ............ G01C 15/002
33/286
(Continued)

FOREIGN PATENT DOCUMENTS

| JP | 2006163637 A | 6/2006 |
|---|---|---|
| JP | 2016030515 A | 3/2016 |
| WO | 2017073636 A1 | 5/2017 |

OTHER PUBLICATIONS

International Search Report and Written Opinion in EP 19751645, dated Sep. 24, 2021, 11 pages.
(Continued)

*Primary Examiner* — Munear T Akki
(74) *Attorney, Agent, or Firm* — Lewis Rice LLC

(57) ABSTRACT

Problem: To provide an autonomous driving indication system that allows a pedestrian or another vehicle to clearly discriminate driving states of an autonomous driving vehicle and provide a vehicle communication system capable of sending an appropriate message to a pedestrian from a vehicle according to the probability of the pedestrian crossing the road.
Means to Solve the Problem: Left and right headlamps (3) are each provided with a first communication lamp (6) and a second communication lamp (7) for indicating an autonomous driving state of a vehicle (1). The first and second communication lamps (6) and (7) are each comprised of a plurality of light emitting segments, and each light emitting
(Continued)

segment is caused to flash by a lamp ECU. When flashing the light emitting segments, the lamp ECU controls the change in the brightness of the light emitting segments according to the driving state of the vehicle. A vehicle ECU or the lamp ECU is provided with a probability computing unit for calculating the probability that a pedestrian will cross the road, and a control unit for switching the light output of light emitting segments individually or in unison according to the probability.

5 Claims, 19 Drawing Sheets

(51) Int. Cl.
*B60Q 1/18* (2006.01)
*B60Q 1/46* (2006.01)
*G07C 5/06* (2006.01)
*G07C 5/08* (2006.01)

(56) References Cited

U.S. PATENT DOCUMENTS

| | | | |
|---|---|---|---|
| 8,408,765 B2* | 4/2013 | Kuhlman | F21S 41/25 |
| | | | 362/488 |
| 10,315,563 B1* | 6/2019 | Harper | B60Q 5/006 |
| 10,960,807 B2* | 3/2021 | Sawada | B60Q 1/0023 |
| 2008/0084286 A1 | 4/2008 | Teramura et al. | |
| 2013/0027976 A1 | 1/2013 | Robbins et al. | |
| 2014/0375448 A1* | 12/2014 | Lee | B60Q 1/441 |
| | | | 340/479 |
| 2015/0258928 A1* | 9/2015 | Goto | B60Q 1/525 |
| | | | 701/49 |
| 2017/0273159 A1* | 9/2017 | Akselrod | H05B 47/105 |
| 2019/0168664 A1 | 6/2019 | Tatara et al. | |
| 2020/0094734 A1* | 3/2020 | King | B60Q 1/30 |

OTHER PUBLICATIONS

Intellectual Property Japan, Reasons for Refusal for Japanese Application No. 2019-570771, dated Aug. 2, 2022.

* cited by examiner

How to Calculate Probability of Crossing

<Factors Regarding Behavior of Pedestrian>

| Orientation of pedestrian | Probability |
|---|---|
| 1. Oriented toward inside of road | High |
| 2. Oriented toward or away from vehicle | Intermediate |
| 3. Oriented toward outside of road | Low |

| Direction in which pedestrian is looking | Probability |
|---|---|
| 1. Toward vehicle | High |
| 2. Direction other than toward vehicle | Low |

| Adult or child | Probability |
|---|---|
| 1. Child | High |
| 2. Adult | Low |

| Route information | Probability |
|---|---|
| 1. Available | High |
| 2. Unavailable | Low |

<Factors Regarding Road Conditions>

| Crosswalk | Probability |
|---|---|
| 1. Signalized | High |
| 2. Unsignalized | Intermediate |
| 3. No crosswalk | Low |

| Time slot | Probability |
|---|---|
| 1. Daytime | High |
| 2. Nighttime | Low |

| Traffic volume | Probability |
|---|---|
| 1. Light | High |
| 2. Heavy | Low |

| Area | Probability |
|---|---|
| 1. Residential area /urban area | High |
| 2. Other than above | Low |

FIG. 12

Method of Controlling Communication Lamps

| Probability | Control method | | | |
|---|---|---|---|---|
| | Brightness | Frequency of flashing | Flash timing | Number of segments turned on |
| High | Bright | High | Fast | Many |
| Low | Dim | Low | Slow | Few |

FIG. 13

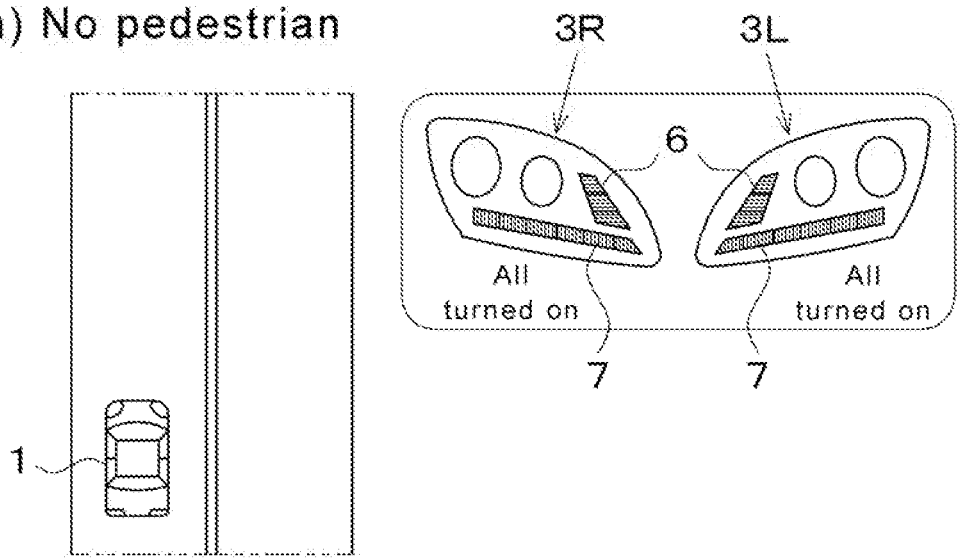
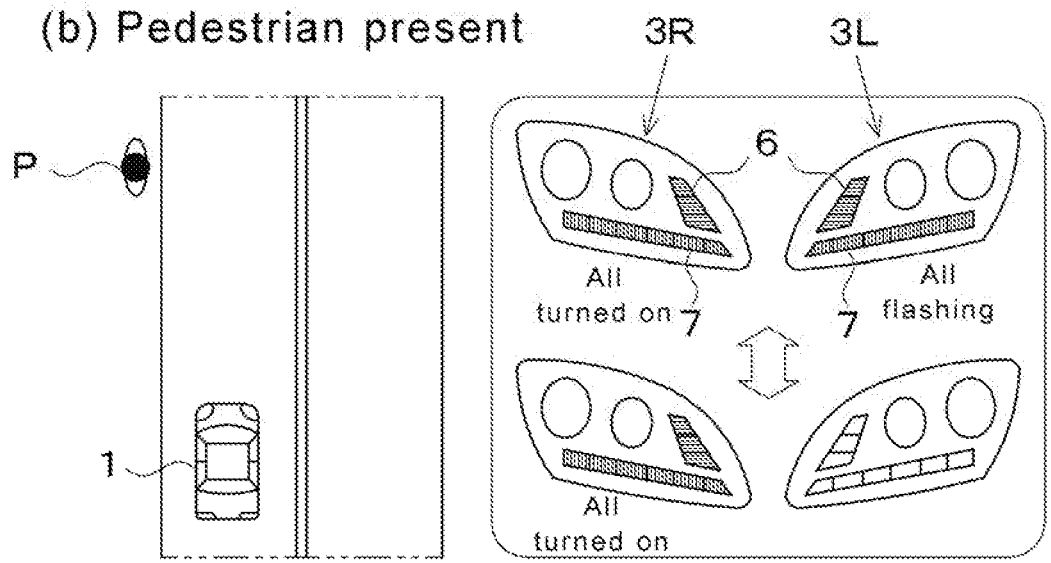
FIG. 14

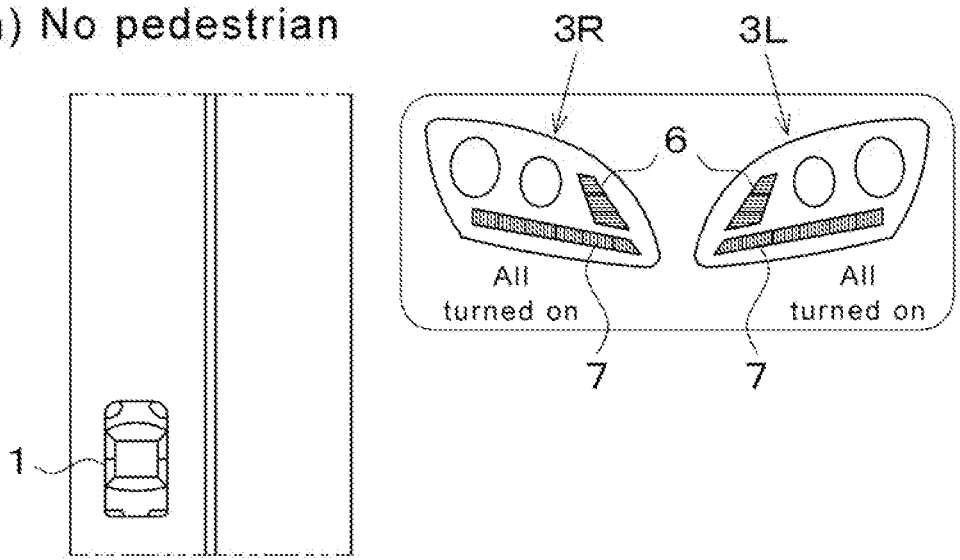
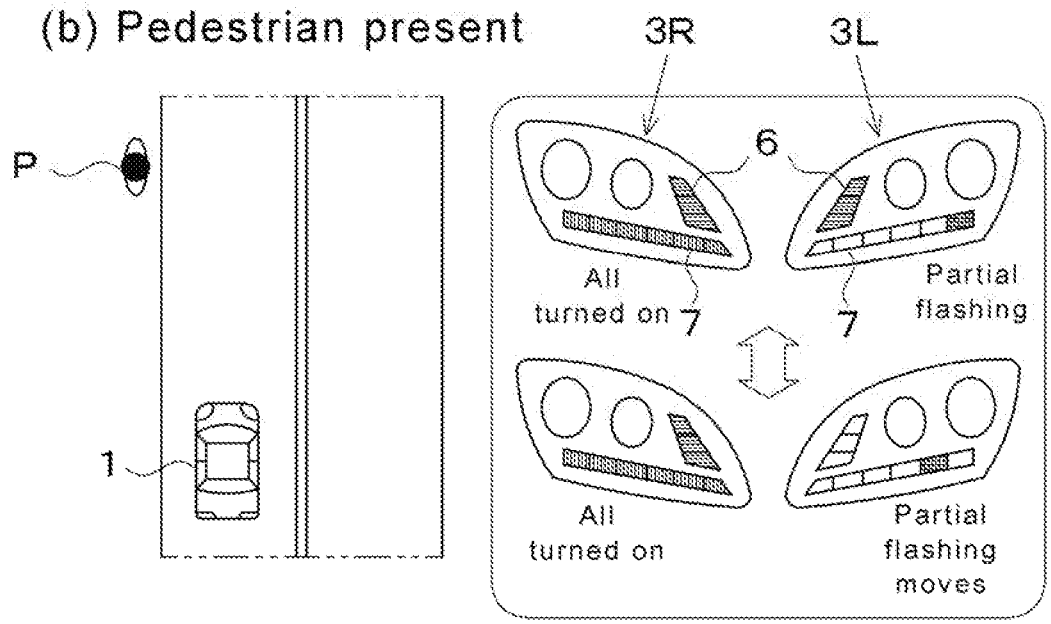
FIG. 15

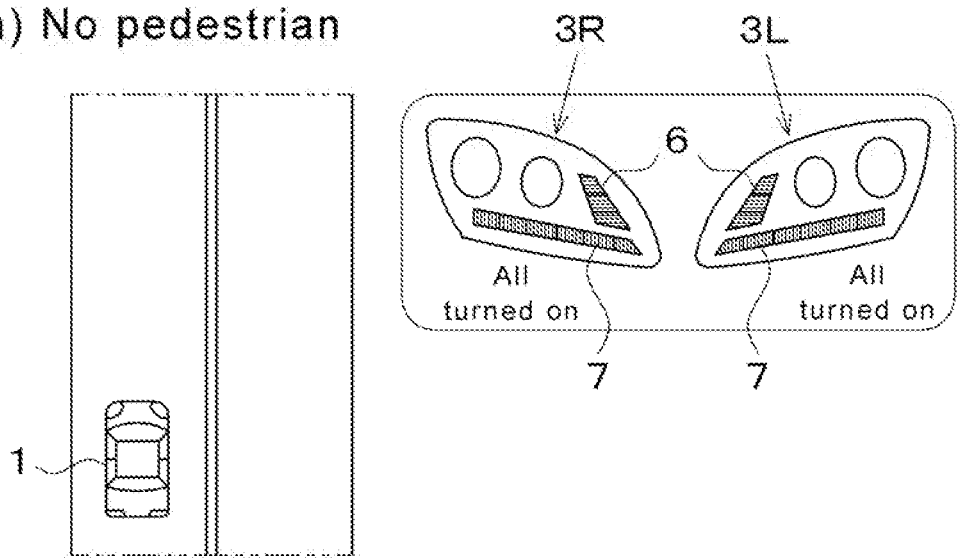
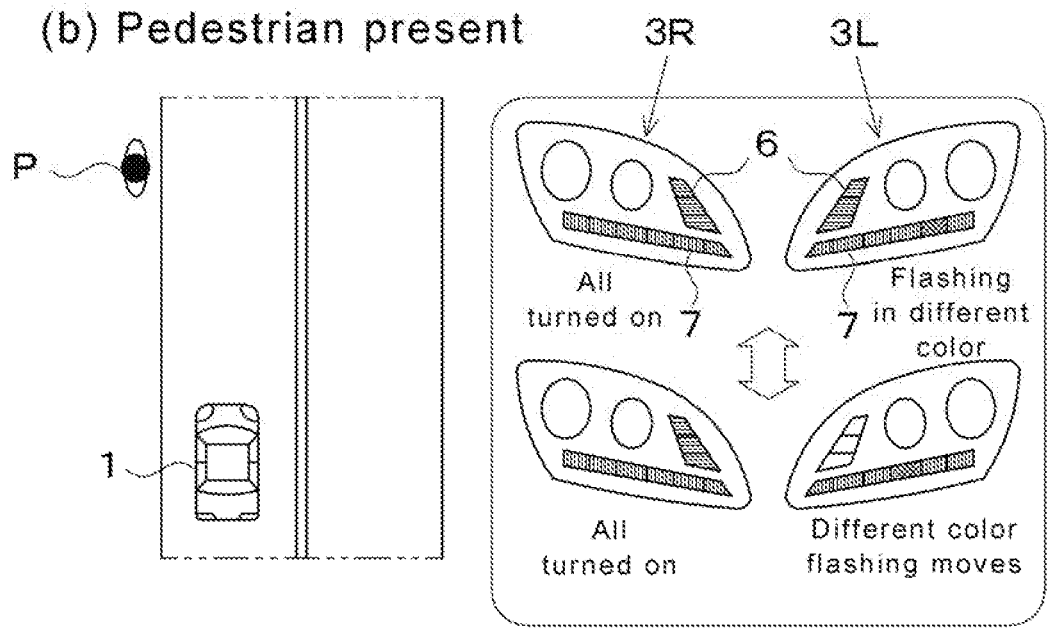
FIG. 16

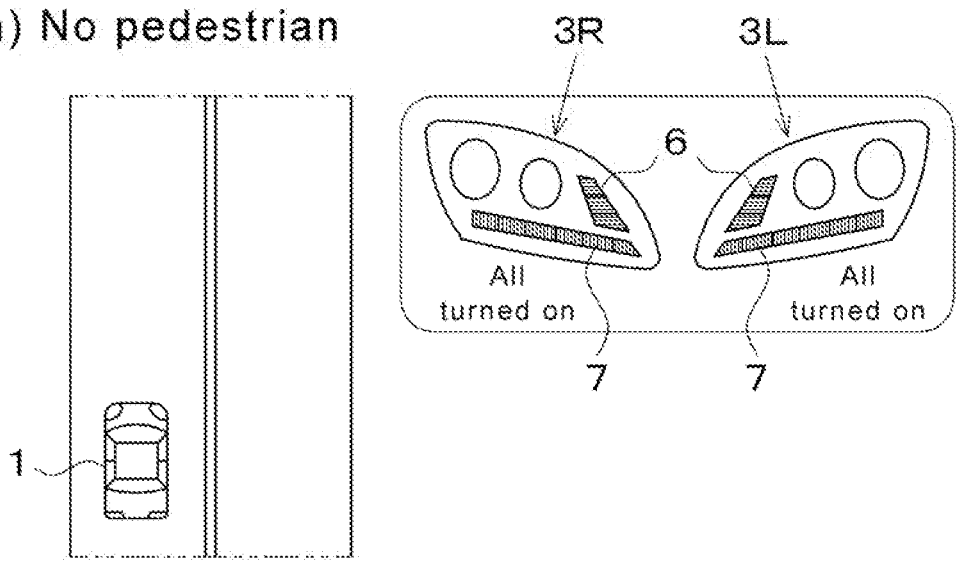
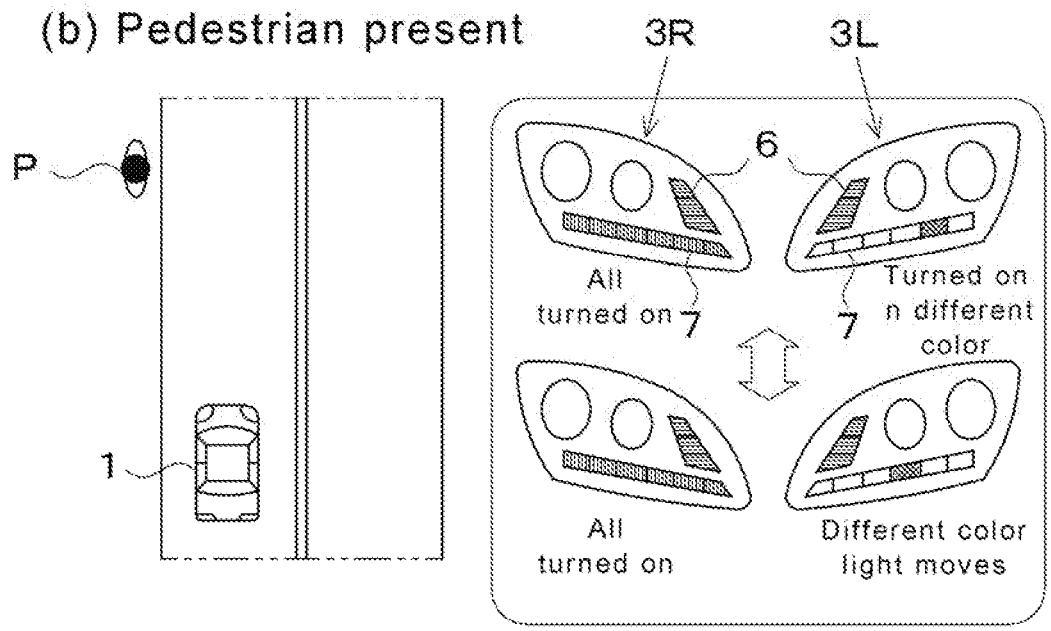
FIG. 17

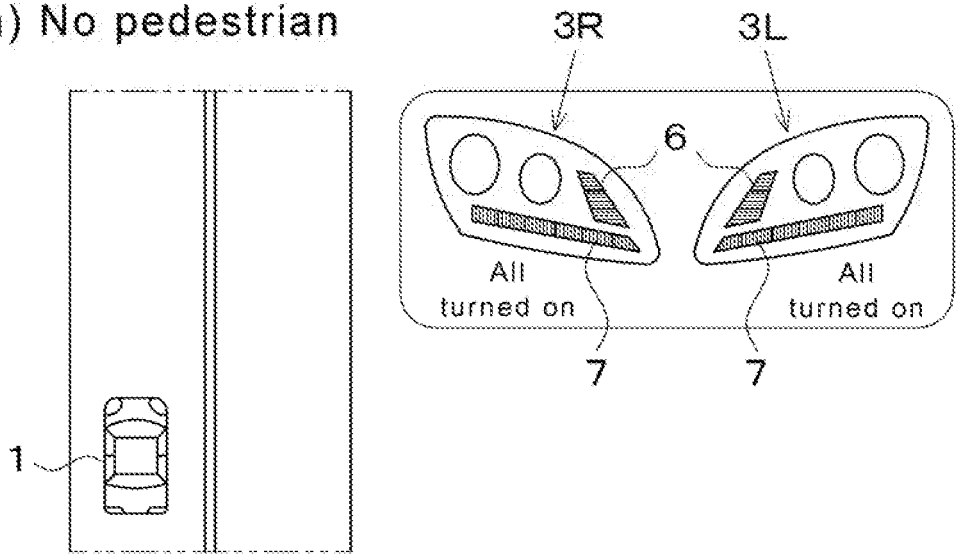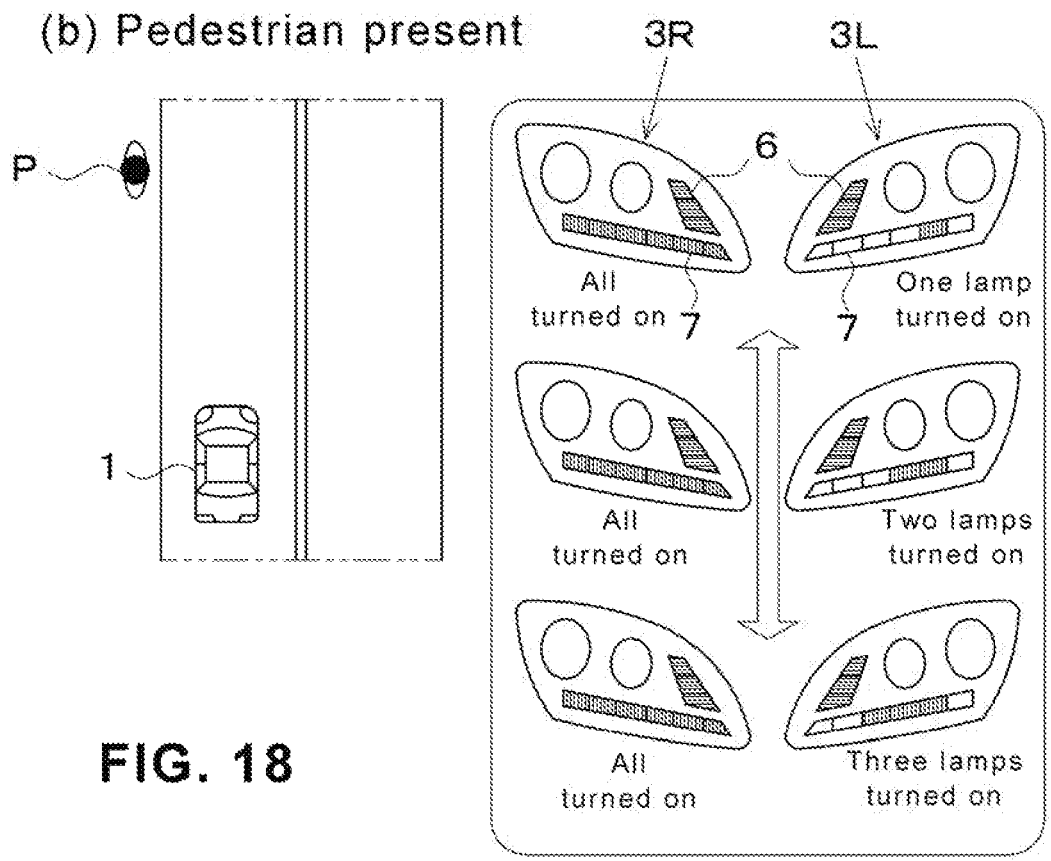
FIG. 18

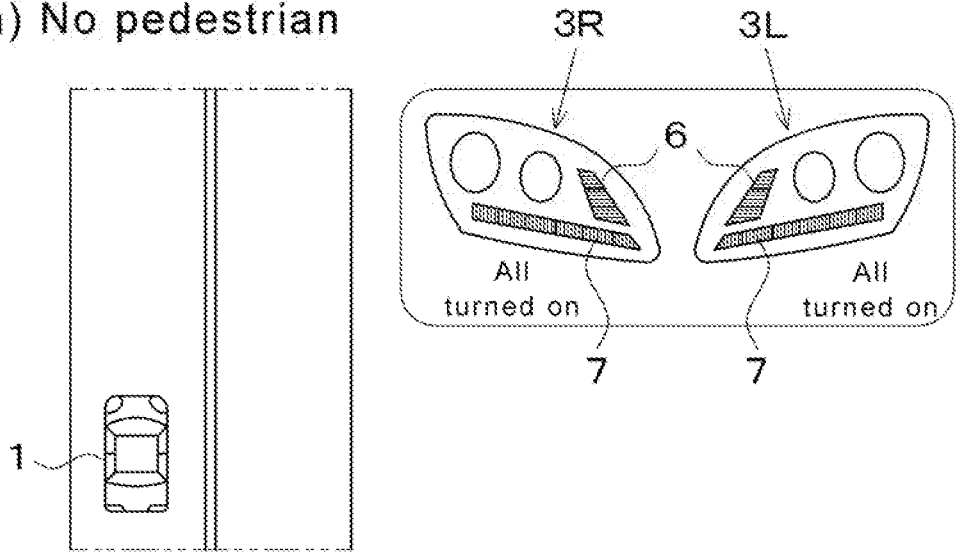
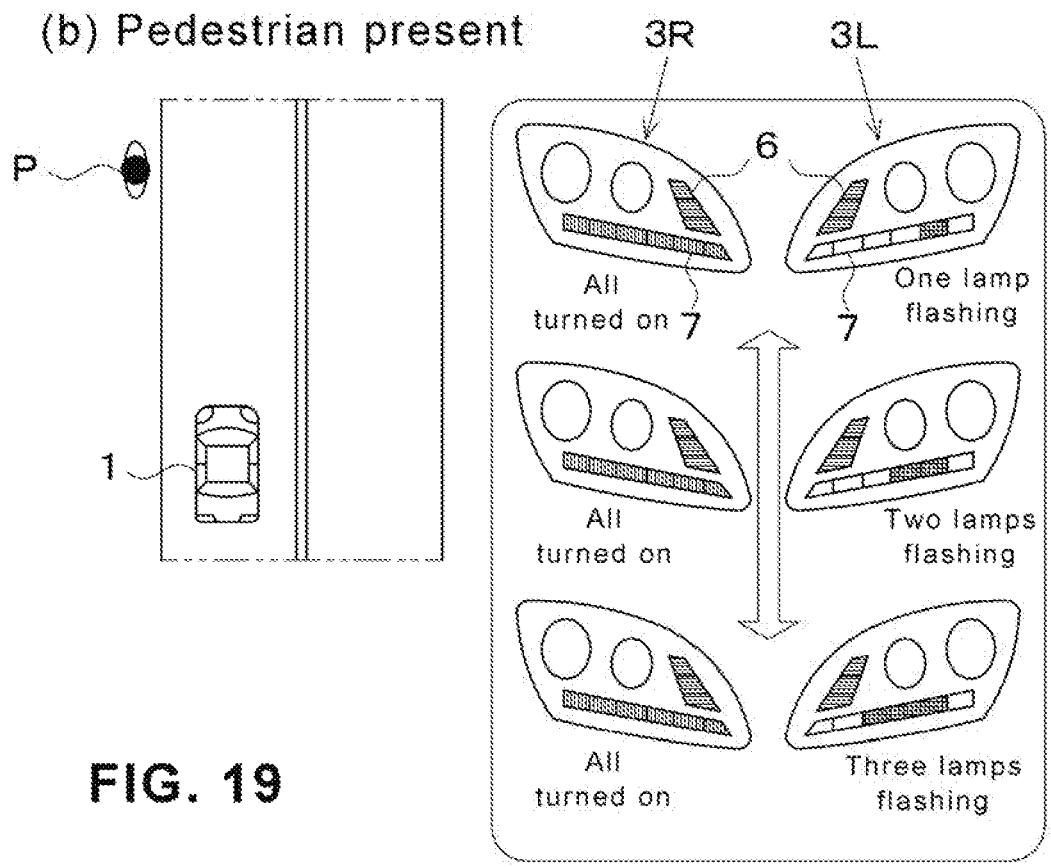
FIG. 19

AUTONOMOUS DRIVING INDICATION SYSTEM AND VEHICLE COMMUNICATION SYSTEM

CROSS REFERENCE TO RELATED APPLICATION(S)

This application is a 0371 U.S. National Phase of International Application Serial No.: PCT/JP2019/004190 filed Feb. 6, 2019, which is turn claims priority to Japanese Patent Application Serial No: 2018-020907, filed Feb. 8, 2018 and Japanese Patent Application Serial No: 2018-020933, filed Feb. 8, 2018. The entire disclosure of all the above documents is herein incorporated by reference.

TECHNICAL FIELD

The present invention relates to an autonomous driving indication system for letting a pedestrian or another vehicle (hereinafter referred to as a pedestrian, etc.) clearly know that a vehicle is autonomously driven, and to a vehicle communication system for allowing a pedestrian who is about to cross a road to know that a vehicle being autonomously driven has detected the pedestrian.

BACKGROUND OF THE INVENTION

Challenging problems of autonomous driving under development include communication between a vehicle and a pedestrian, etc. As such, conventionally, technologies have been proposed to facilitate communication between an autonomous driving vehicle and a pedestrian, etc., by changing the flashing cycle, the light emitting area, the color of emitted light, the luminance, etc., of lamps depending on the driving state of the vehicle.

For example, Patent Literature 1 describes a technology wherein movable devices are mounted in vehicle lights, a pedestrian in the vicinity of a vehicle is detected with sensors, and the movable devices are turned to the pedestrian when the pedestrian comes close to the vehicle. This allows the pedestrian to know that the pedestrian has been detected by the vehicle, thus making the pedestrian in the vicinity of the autonomous driving vehicle feel safe. Furthermore, in order to facilitate communication by means of light emitted from lamps, for example, Patent Literature 2 proposes a technology for gradually changing the control voltages of the lamps with the passage of time so as to slowly flash the lamps.

PRIOR ART DOCUMENTS

Patent Literature

Patent Literature 1: Japanese Published Unexamined Patent Application No. 2015-174541
Patent Literature 2: Japanese Published Unexamined Patent Application No. 2016-68707

SUMMARY OF THE INVENTION

Problem to be Solved by the Invention

Indeed, a technique to slowly flash lamps easily catches a person's attention. However, if the lamps always flash in the same manner during autonomous driving, a pedestrian, etc., will not be able to determine the driving state of the vehicle based on the flashing of the lamps. As such, there is a problem that a pedestrian, etc., located away from and forward of the vehicle, for example, may not be able to tell from the flashing of the lamps whether the autonomous driving vehicle is driving or stationary.

Moreover, it is difficult to accurately predict the behavior of a pedestrian standing on the roadside by using sensors. For example, it is not possible to accurately tell by using sensors whether the pedestrian is about to cross the road, continuing to move on along the sidewalk, or waiting there for another vehicle to arrive. As such, according to the prior art, there has been a problem that pedestrians not planning to make a crossing are irradiated and annoyed with the light from the movable lamps.

Therefore, one object of the present invention is to provide an autonomous driving indication system that allows a pedestrian, etc., to clearly discriminate driving states of an autonomous driving vehicle and provide a vehicle communication system capable of predicting the behavior of a pedestrian and sending a more appropriate message to the pedestrian from the vehicle.

Means to Solve the Problem

In order to solve the above-described problem, an autonomous driving indication system of the present invention is characterized by comprising a lamp for indicating that a vehicle is autonomously driven, and a lamp ECU for flashing the lamp, wherein during flashing, the lamp ECU instantaneously changes the brightness of the lamp when the vehicle is driving and performs control to gradually change the brightness of the lamp with the passage of time while the vehicle is stationary.

While the lamp for indicating autonomous driving is not limited to any particular models or configurations, it is desirable that the lamp is composed of a plurality of light emitting segments from the viewpoint of enhancing its ability to communicate with a pedestrian, etc.

In this case, in order to let a pedestrian, etc., know of a change in the driving state, it is preferred that while the vehicle is driving, the lamp ECU individually controls the flashing of the light emitting segments. On the other hand, while the vehicle is stationary, it is preferred that the lamp ECU controls the flashing of the light emitting segments in unison as it is possible to more clearly indicate the stationary state.

In particular, to allow a pedestrian, etc., to distinguish between acceleration and deceleration of the driving vehicle, it is preferred that the lamp ECU performs control to cause the light emitting segments to flash in a different sequence during acceleration of the vehicle from during its deceleration. It should be noted that where the lamp is disposed may not be limited to any specific location; they may, for example, be disposed in a headlamp.

Furthermore, in order to solve the above-described problem, a vehicle communication system of the present invention is characterized by comprising a lamp for indicating that a vehicle is autonomously driven, and a computing means for calculating the probability of a pedestrian in the vicinity of the vehicle crossing a road, and a control means for controlling light output of the lamp according to the calculated probability.

In this case, the computing means can calculate the probability of the pedestrian crossing the road based on the information about behavior of the pedestrian received from sensors on board of the vehicle and a communication terminal carried by the pedestrian. Alternatively, it can also calculate the probability of the pedestrian crossing the road based on the information about the road conditions in the vicinity of the vehicle received from communication equipment provided in the road infrastructure.

Additionally, while the lamp for indicating autonomous driving is not limited to any particular models or configurations, it is preferred that they are composed of a plurality of light emitting segments from the viewpoint of enhancing the ability to communicate with a pedestrian, etc., and that the control means is configured to individually control the flashing of the light emitting segments. More preferably, the lamp is disposed in a headlamp.

Advantageous Effects of the Invention

As the autonomous driving system of the present invention, during flashing of the lamp, instantaneously changes the brightness of the lamp while the vehicle is driving, and performs control to gradually change the brightness of the lamp while the vehicle is stationary, a beneficial effect is provided that a pedestrian, etc., can clearly discriminate between driving state and stationary state of the autonomous driving vehicle. Moreover, as the autonomous driving system of the present invention controls the light output of the lamp according to the probability of a pedestrian crossing the road, a beneficial effect is provided that an appropriate message can be sent to the pedestrian from the vehicle.

BRIEF DESCRIPTION OF DRAWINGS

FIG. 12 is an explanatory diagram showing how to determine the probability of a pedestrian crossing a road.

FIG. 13 is an explanatory diagram showing a method of controlling the communication lamps.

FIG. 14 is a schematic diagram showing pedestrian-vehicle communication of Example 1.

FIG. 15 is a schematic diagram showing pedestrian-vehicle communication of Example 2.

FIG. 16 is a schematic diagram showing pedestrian-vehicle communication of Example 3.

FIG. 17 is a schematic diagram showing pedestrian-vehicle communication of Example 4.

FIG. 18 is a schematic diagram showing pedestrian-vehicle communication of Example 5.

FIG. 19 is a schematic diagram showing pedestrian-vehicle communication of Example 6.

DESCRIPTION OF EMBODIMENTS

Figure 1:
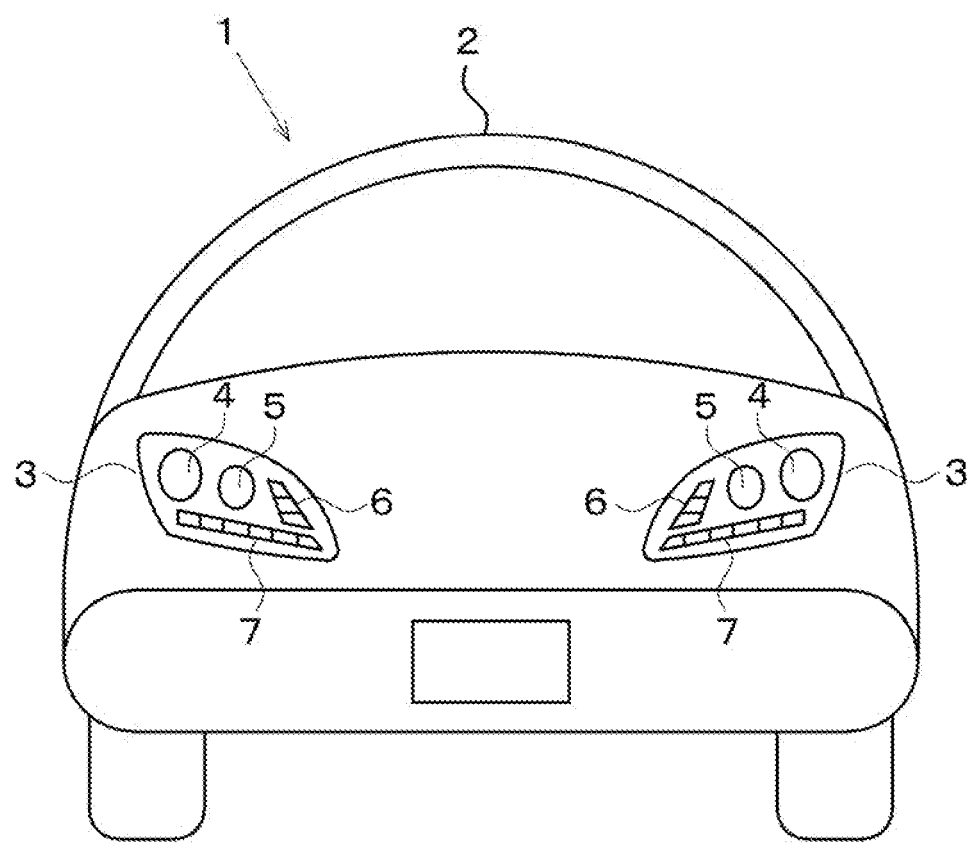
FIG. 1 is a front view of a vehicle showing one embodiment of the present invention.

An embodiment of the present invention will be described hereinafter based on the drawings. The vehicle 1 shown in FIG. 1 is provided with a pair of left and right headlamps 3 in the front of a vehicle body 2. A low beam lamp 4, a high beam lamp 5, a first communication lamp 6, and a second communication lamp 7 are provided in the housing (not shown) of each of the headlamps 3.

Figure 2:
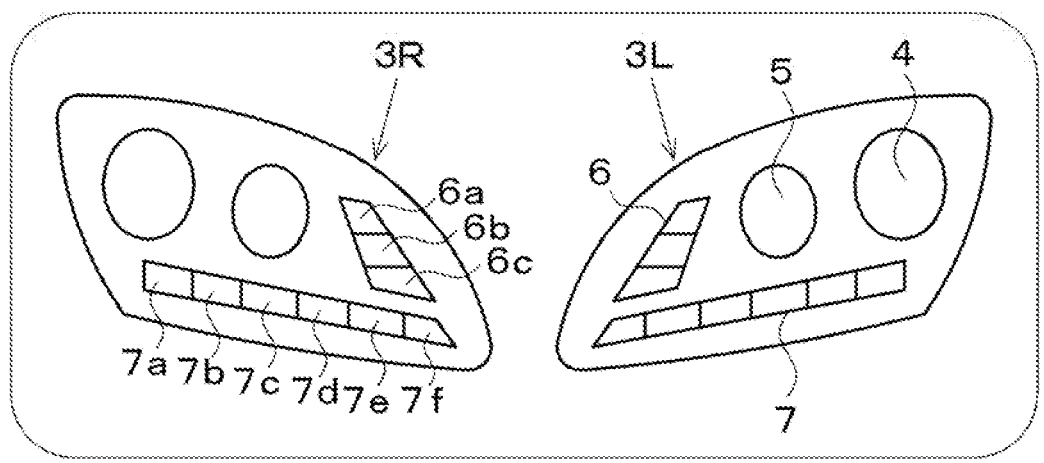
FIG. 2 is a front view of the headlamps showing the light emitting segments of the lamps.

When an autonomous driving mode is set for the vehicle 1, the first and second communication lamps 6 and 7 function as lamps to indicate its driving state to a pedestrian, etc., by flashing. As shown in FIG. 2, the first communication lamps 6 are each composed of three light emitting segments 6a-6c in a vertical configuration, and the second communication lamps 7 are each composed of six light emitting segments 7a-7f in a horizontal configuration.

It should be noted that when a manual driving mode is set for the vehicle 1, the first communication lamps 6 function as daytime running lamps and the second communication lamps 7 function as turn-signal lamps.

Figure 3:
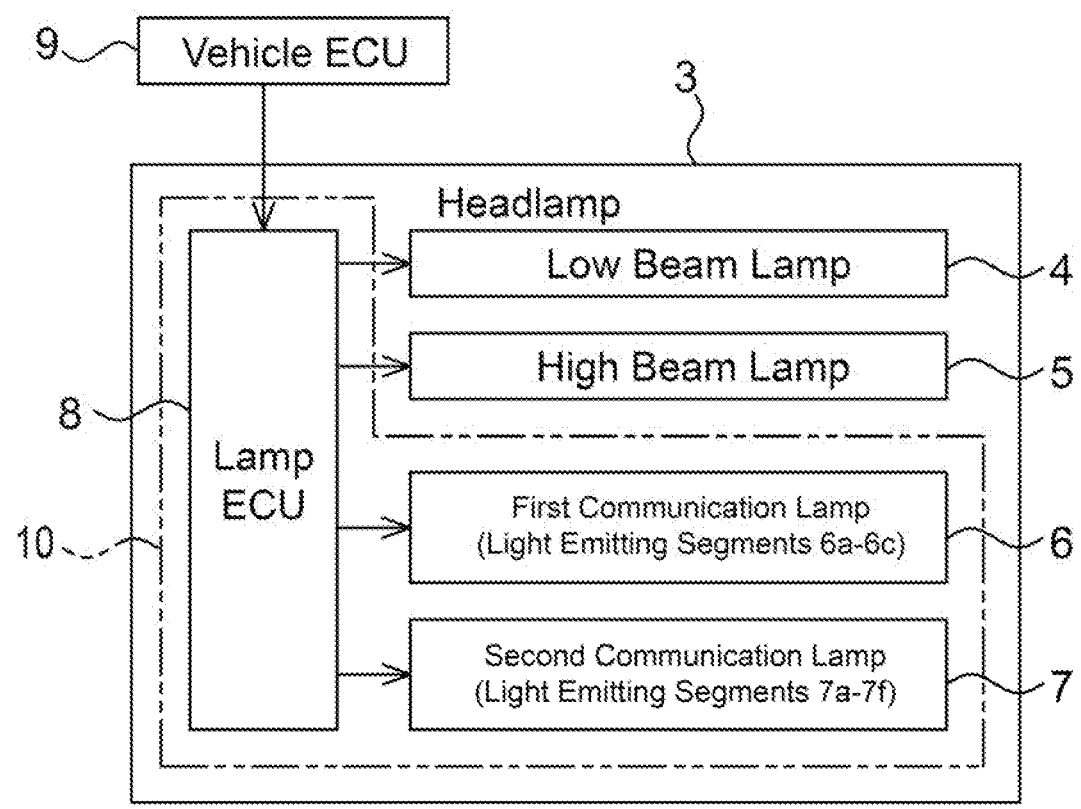
FIG. 3 is a block diagram showing an autonomous driving indication system.

As shown in FIG. 3, a lamp ECU 8 for flashing four types of lamps 4, 5, 6, and 7 is disposed in the housing of the headlamp 3. The lamp ECU 8 comprises an autonomous driving indication system 21 together with the two types of communication lamps 6 and 7 and, when the autonomous driving mode is set for the vehicle 1, controls each light emitting segment of the communication lamps 6 and 7 in response to a command from a vehicle ECU 9.

Figure 4:
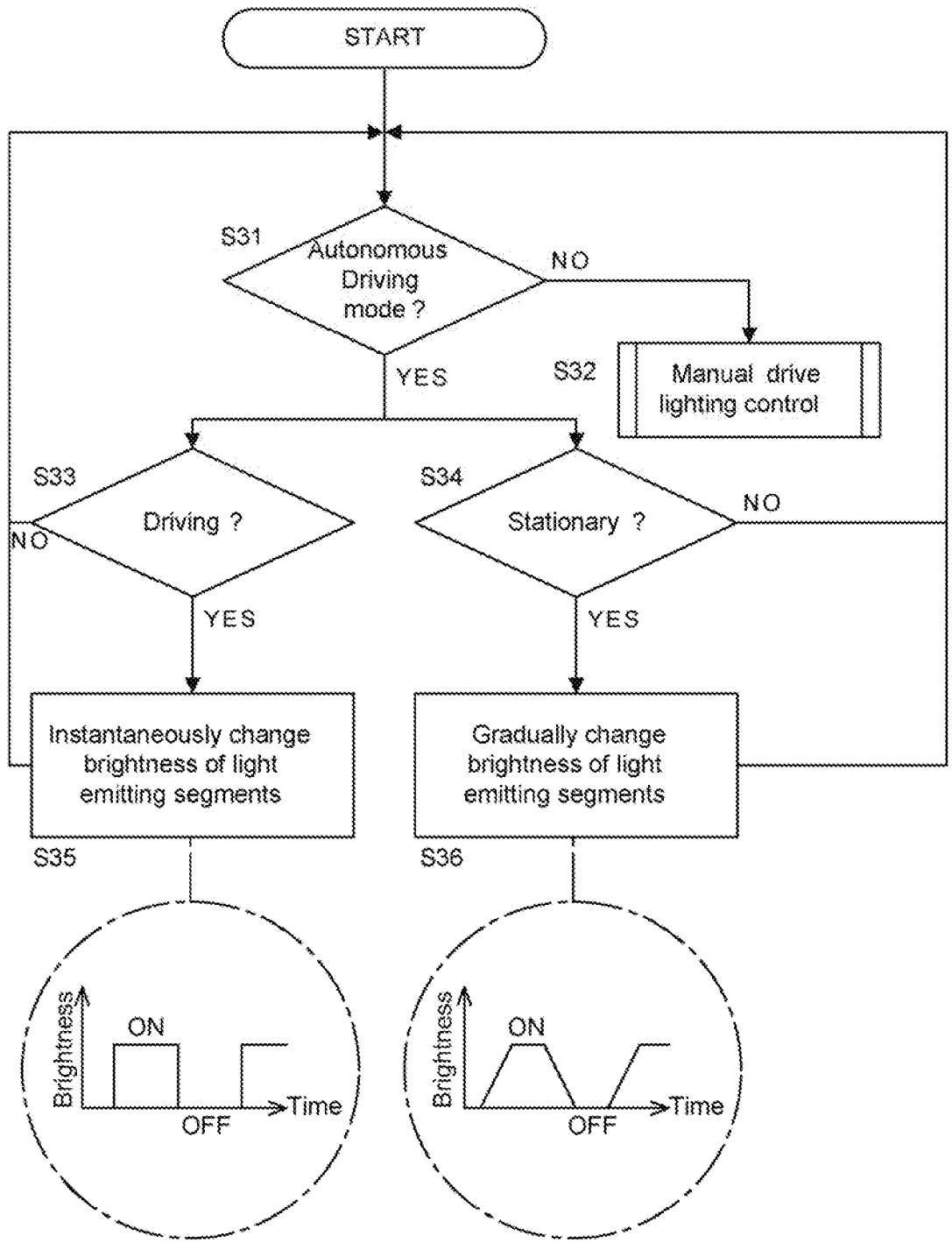
FIG. 4 is a flowchart showing the operation of the autonomous driving indication system.

As shown in FIG. 4, initially, the lamp ECU 8 determines whether or not the autonomous driving mode is set (S31). If the autonomous driving mode is not set, manual drive lighting control is performed to flash the four types of lamps 4-7 in the same manner as during manual driving (S32). If the autonomous driving mode is set, it is determined whether or not the vehicle 1 is driving (S33) or stationary (S34) based on a command from the vehicle ECU 9.

If the vehicle 1 is driving, the lamp ECU 8 instantaneously changes the brightness (i.e., the driving voltages) of the light emitting segments as the first and/or second communication lamps 6, 7 flash (S35). On the other hand, if the vehicle 1 is stationary, gradual change control is performed to gradually change the brightness of the light emitting segments with the passage of time, as the first and/or second communication lamps 6, 7 flash (S36).

Figure 5:
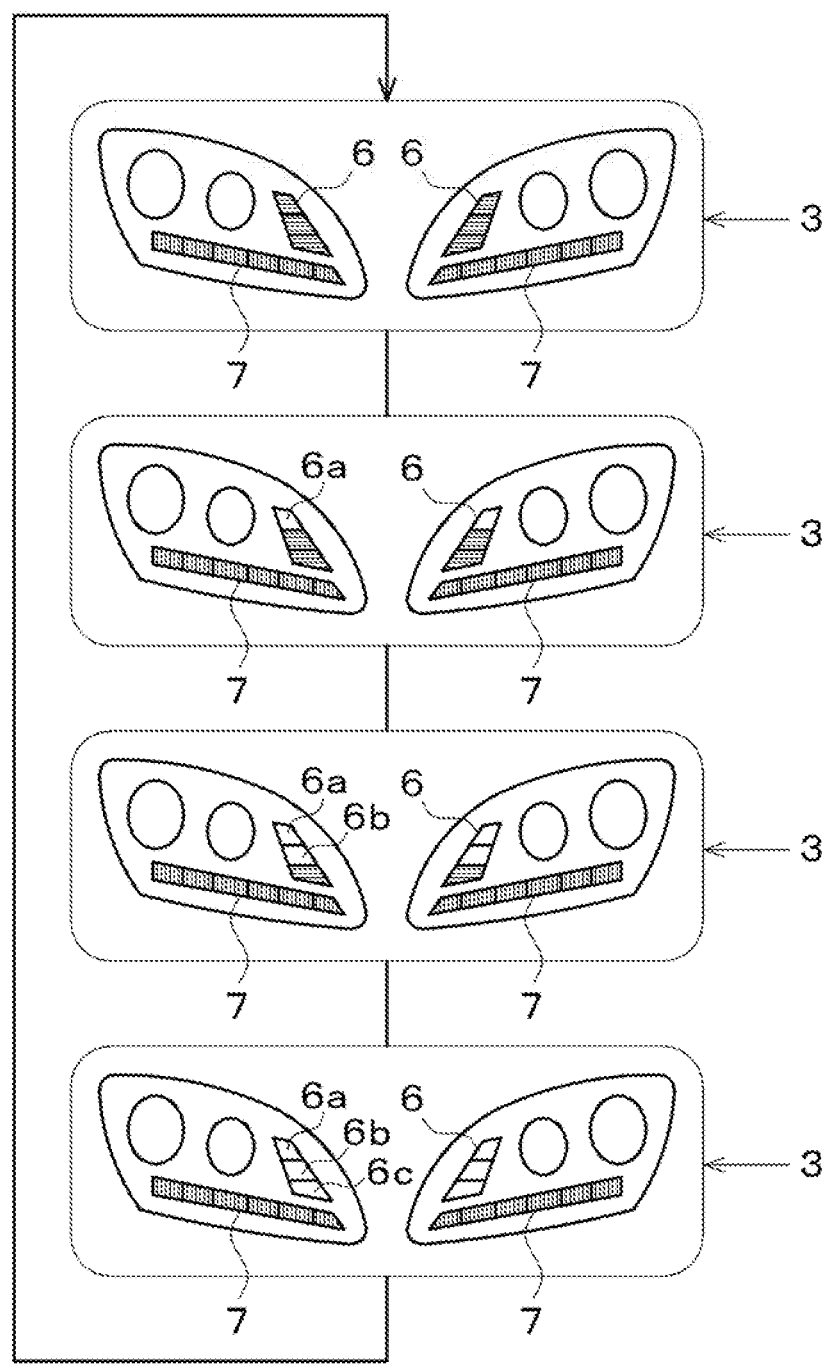
FIG. 5 is a front view of the headlamps, showing an example of a method for controlling the lamps during driving.
Figure 6:
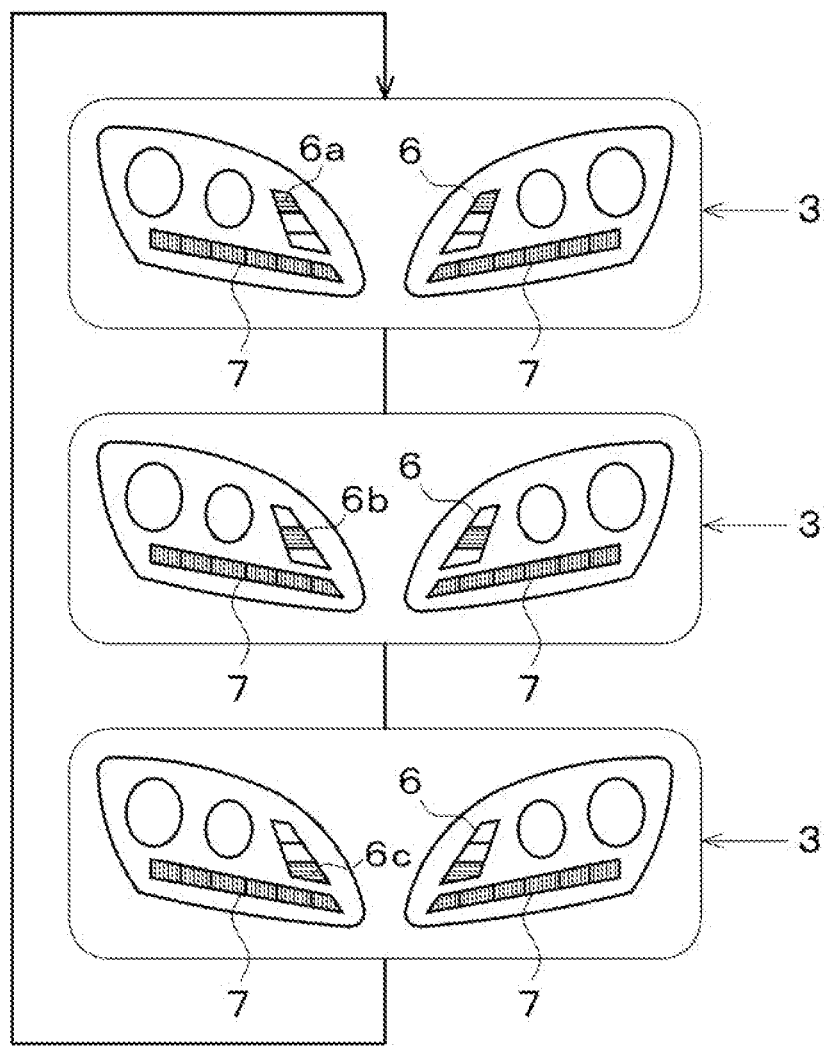
FIG. 6 is a front view of the headlamps, showing another example of a method for controlling the lamps during driving.

FIGS. 5 and 6 show examples of control performed when the vehicle is driving. When the vehicle is driving, the three light emitting segments 6a-6c of the first communication lamps 6 are individually flashed with all the six light emitting segments 7a-7f of the second communication lamps 7 turned on. In particular, during flashing, the acceleration/deceleration of the vehicle in autonomous driving is easily indicated to a pedestrian, etc., by performing gradual-change control on the brightness of the light emitting segments 6a-6c of the first communication lamps 6.

In the example of control shown in FIG. 5, during deceleration, the light emitting segments 6a, 6b, and 6c of each of the first communication lamps 6 in a fully turned-on condition are sequentially turned off from the top to the bottom to gradually reduce the light emitting area, and this gradual change operation is repeated to express the deceleration of the vehicle 1. During acceleration, conversely, the light emitting segments 6a, 6b, and 6c in a fully turned-off condition are sequentially turned on from the bottom to the top to gradually increase the light emitting area, and this gradual change control is repeated to express the acceleration of the vehicle 1.

In the example of control shown in FIG. 6, during deceleration, the light emitting segments 6a-6c of each of the first communication lamps 6 are sequentially flashed, one at a time, so as to slowly move the location of the segment turned on from the top to the bottom, and this gradual change control is repeated to express the deceleration of the vehicle 1. During acceleration, conversely, the location of the single segment turned on is slowly moved from the bottom to the top to express the acceleration of the vehicle 1.

Figure 7:
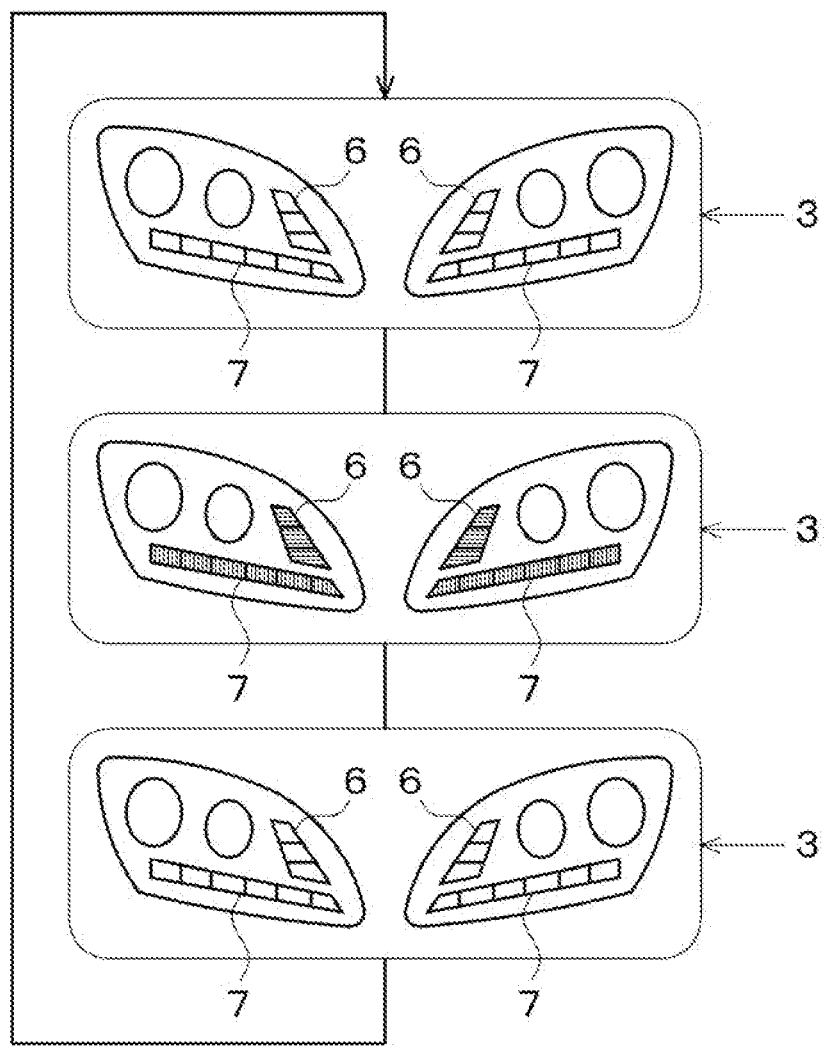
FIG. 7 is a front view of the headlamps, showing an example of a method for controlling the lamps while the vehicle is stationary.
Figure 8:
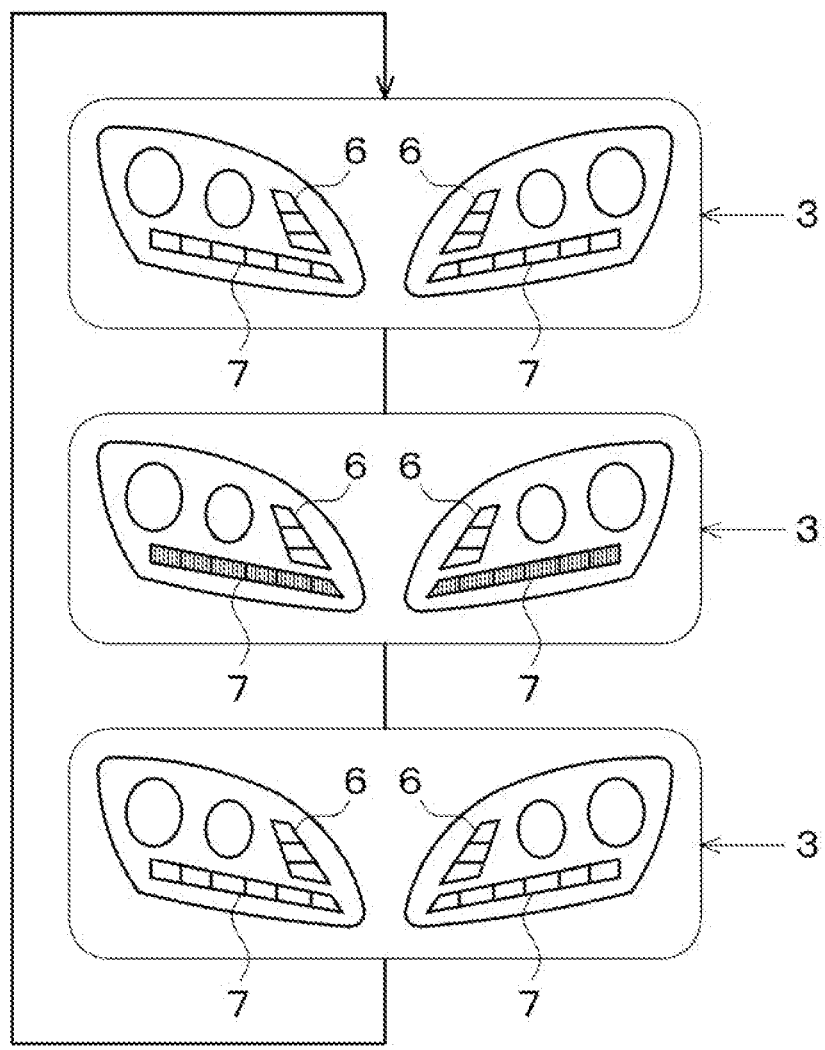
FIG. 8 is a front view of the headlamps, showing another example of a method for controlling the lamps while the vehicle is stationary.
Figure 9:
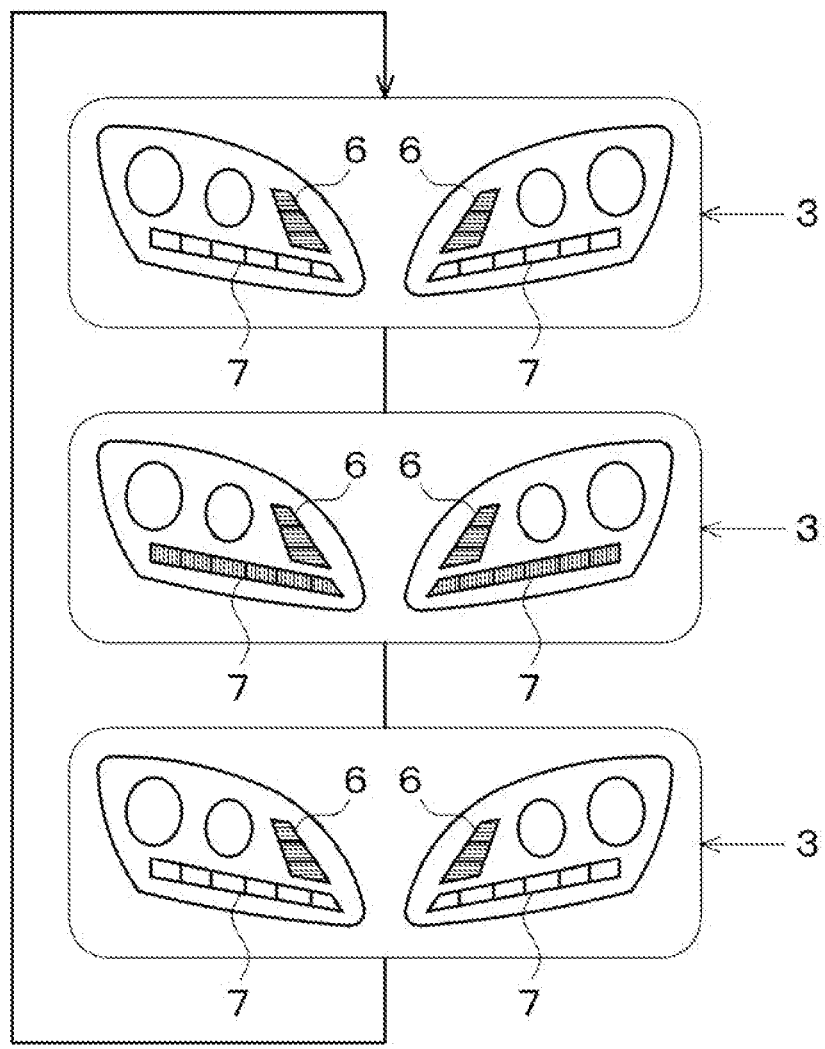
FIG. 9 is a front view of the headlamps, showing yet another example of a method for controlling the lamps while the vehicle is stationary.

FIGS. 7, 8, and 9 show examples of control performed while the vehicle is stationary. In the example of control shown in FIG. 7, the three light emitting segments of each first communication lamp 6 and the six light emitting segments of each second communication lamp 7 are all flashed in unison. In particular, during flashing, the stationary state of the vehicle in autonomous driving is easily indicated to a pedestrian, etc., by changing the brightness of each light emitting segment with the passage of time.

In the example of control shown in FIG. 8, each light emitting segment of the second communication lamps 7 is flashed in unison while each light emitting segment of the first communication lamps 6 remains off. In the example of control shown in FIG. 9, each light emitting segment of the second communication lamps 7 is flashed in unison while each light emitting segment of the first communication lamps 6 remains on. In both cases, while the second communication lamps 7 are flashed, the brightness of the light emitting segments thereof is controlled to gradually change.

Figure 10:
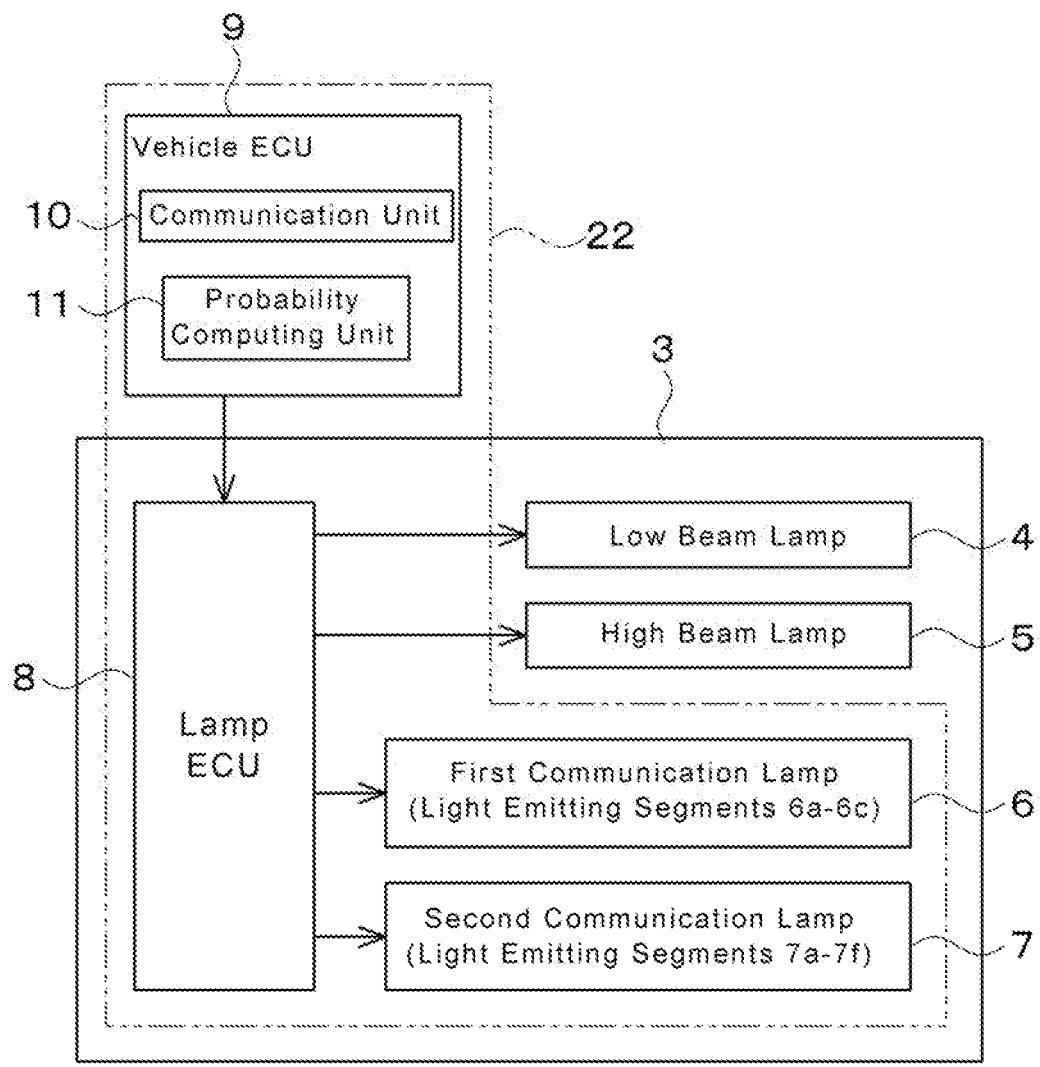
FIG. 10 is a block diagram showing the configuration of a vehicle communication system.

The following describes a vehicle communication system 22. As shown in FIG. 10, a lamp ECU 8 for causing the lamps 4, 5, 6 and 7 to flash is disposed in each headlamp 3. The lamp ECU 8 is electrically connected with the vehicle ECU 9 on the vehicle 2, and the vehicle ECU 9 is provided with a communication unit 10 and a probability computing unit 11. It should be noted that the communication unit 10 and the probability computing unit 11 may alternatively be disposed in the lamp ECU 8.

The communication unit 10 obtains information about the behavior of a pedestrian and information about the road condition from the sensors on board of the own vehicle, communication equipment of the road infrastructure, GPS's, mobile radio terminals (none shown) of the pedestrian, etc. The probability computing unit 11 calculates, based on the information obtained by the communication unit 10, the probability that a pedestrian in the vicinity of the vehicle will cross the road. Further, the communication unit 10, the probability computing unit 11, and the lamp ECU 8 comprise the vehicle communication system 22.

Figure 11:
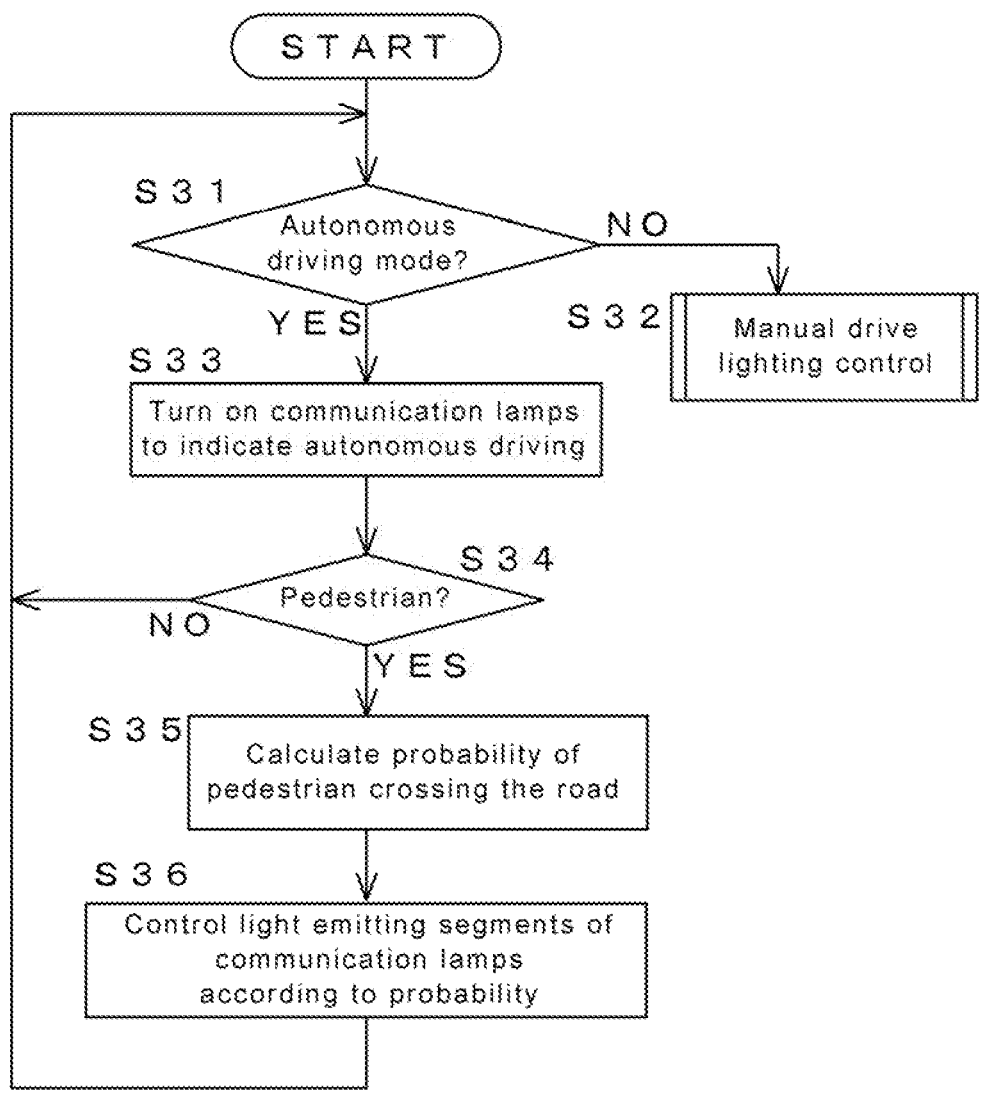
FIG. 11 is a flowchart showing the operation of the communication system.

FIG. 11 shows the operation of the vehicle communication system 22. The vehicle ECU 8 determines whether or not the autonomous driving mode is set for the vehicle 1 (S31). If the autonomous driving mode is not set, manual drive lighting control is performed to flash each lamp 4-7 of the headlamps 3 in the same manner as during manual driving (S32). Once the autonomous driving mode is set, the communications lamps 6 and 7 are turned on to indicate that the vehicle 1 is autonomously driven (S33).

If a pedestrian is detected by a vehicle-mounted camera, etc., (S34), the vehicle ECU 9 calculates, at the probability computing unit 11, the probability that the pedestrian will cross the road based on the information on the behavior of the pedestrian and the road condition (S35), and transmits the result of calculation to the lamp ECU 8. Then, serving as a means of control, the lamp ECU 8 controls the light output of the light emitting segments 6a-6c and 7a-7f of the communication lamps 6 and 7 individually or in unison according to the calculated probability (S36).

Note that, preferably, the probability of the pedestrian crossing the road is evaluated comprehensively based on a plurality of factors and expressed in a numerical value. FIG. 12 illustrates several factors related to the behavior of a pedestrian and several factors related to the condition of the road. The former factors may include the orientation of the pedestrian, the direction in which the pedestrian is looking, an adult or child, and route information, etc. The latter factors may include a crosswalk, the time slot, the traffic volume, and the driving area, etc.

For example, as for the orientation of the pedestrian, the probability of the pedestrian crossing the road can be expressed in a high numerical value if the pedestrian is oriented toward the inside of the road; the probability of his/her crossing can be expressed in a low numerical value if the pedestrian is oriented toward the outside of the road; and the probability of his/her crossing can be expressed in an intermediate numerical value if the pedestrian is oriented toward or away from the vehicle. As for the crosswalk, the probability can be expressed in a high numerical value if it is a signalized crosswalk; the probability of the pedestrian crossing the road can be expressed in a low numerical value if it is an unsignalized crosswalk; and the probability of the pedestrian crossing the road can be expressed in an intermediate numerical value if there is no crosswalk on the road.

As for the route information, the probability of his/her crossing is evaluated as high if the destination information obtained from the pedestrian's wearable device includes a crossing route, and the probability is evaluated as low if the destination information does not include a route crossing the road. As for the time slot, by considering the levels of difficulty of detecting the pedestrian with a vehicle-mounted sensor, the probability of his/her crossing is evaluated as high during the daytime, during which detection accuracy is high, and the probability is evaluated as low during the nighttime. The probability that the pedestrian will cross the road can be estimated more accurately by appropriately combining the evaluations of these plurality of factors expressed in numerical values.

Examples of controlling the light output from the communication lamps 6 and 7 according to the probability of his/her crossing include a method shown in FIG. 13. In this case, although the brightness, frequency of flashing, flash timing, and number of segments turned on (light emitting area) are listed as the light output of the lamps 6 and 7, the luminescent color may also be included in addition to these. For example, when controlling the brightness, the lamps 6 and 7 may be controlled to be brighter as the probability becomes higher to more strongly call attention of the pedestrian, and the lamps 6 and 7 may be controlled to be dimmer as the probability becomes lower to call attention of the pedestrian less strongly. FIGS. 14-19 show more specific examples 1-6 of the control method.

Embodiment 1

In Example 1, as shown in FIG. 14(a), if there is no pedestrian ahead of the vehicle 1, the light emitting segments of the communication lamps 6 and 7 of the left and right headlamps 3L and 3R are all turned on in unison to indicate that the vehicle 1 is autonomously driven. As shown in FIG. 14(b), if there is a pedestrian P ahead of the vehicle 1 and to the left of the road, all the light emitting segments of the left headlamp 3L, which is on the side of the pedestrian, flash in a frequency corresponding to the probability that the pedestrian P will make a crossing, while all the light emitting segments of the right headlamp 3R are turned on.

Embodiment 2

In Example 2, as shown in FIG. 15(a), if there is no pedestrian, the light emitting segments of the communication lamps 6 and 7 of the left and right headlamps 3L and 3R are all turned on to indicate that the vehicle 1 is autonomously driven. As shown in FIG. 15(b), if there is a pedestrian P to the left of the road, the light emitting segments of the right headlamp 3R are all turned on while one or two of the light emitting segments of the left headlamp 3L, which are on the side of the pedestrian, flash in a frequency corresponding to the probability of his/her crossing and the location of the flashing segment(s) moves according to the change in the position of the pedestrian P as seen from the own vehicle 1.

Embodiment 3

In Example 3, as shown in FIG. 16(a), if there is no pedestrian, the light emitting segments of the communication lamps 6 and 7 of the left and right headlamps 3L and 3R are all turned on to indicate that the vehicle 1 is autonomously driven. As shown in FIG. 16(b), if there is a pedestrian P to the left of the road, all of the light emitting segments of the right headlamp 3R are turned on while one or two of the light emitting segments of the left headlamp 3L flash in a different color from that of the other segments and in a frequency corresponding to the probability of his/her crossing and the location of the segment(s) flashing in the different color than that of the other segments moves according to the change in the position of the pedestrian P.

Embodiment 4

In Example 4, as shown in FIG. 17(a), if there is no pedestrian, the light emitting segments of the communication lamps 6 and 7 of the left and right headlamps 3L and 3R are all turned on to indicate that the vehicle 1 is autonomously driven. As shown in FIG. 17(b), if there is a pedestrian P to the left of the road, all the light emitting segments of the right headlamp 3R are turned on while one or two of the light emitting segments of the left headlamp 3L turn on in a different color from the color indicative of the autonomous driving and in a frequency corresponding to the probability of his/her crossing and the location of the segment(s) turned on in the different color moves according to the change in the position of the pedestrian P.

Embodiment 5

In Example 5, as shown in FIG. 18(a), if there is no pedestrian, the light emitting segments of the communication lamps 6 and 7 of the left and right headlamps 3L and 3R are all turned on to indicate that the vehicle 1 is autonomously driven. As shown in FIG. 18(b), if there is a pedestrian P to the left of the road, all the light emitting segments of the right headlamp 3R are turned on while one, then two, and then three light emitting segments of the left headlamp 3L turn on at a cyclic speed corresponding to the probability of his/her crossing and the location of the segment(s) turned on moves according to the change in the position of the pedestrian P.

Embodiment 6

In Example 6, as shown in FIG. 19(a), if there is no pedestrian, the light emitting segments of the communication lamps 6 and 7 of the left and right headlamps 3L and 3R are all turned on to indicate that the vehicle 1 is autonomously driven. As shown in FIG. 19(b), if there is a pedestrian P to the left of the road, all the light emitting segments of the right headlamp 3R are turned on while one, then two, and then three light-emitting segments of the left headlamp 3L flash at a cyclic speed corresponding to the probability of his/her crossing, and the location of the flashing segment(s) moves according to the change in the position of the pedestrian P.

It should be noted that, while autonomous driving of the vehicle is indicated by the two types of communication lamps 6 and 7 in the foregoing embodiment, one or at least three types of communication lamps may be used to make that indication. The locations where the communication lamps are disposed are not limited to the headlamps 3; they may be disposed in side mirrors or in rear combination lamps. Alternatively, the communication lamps may be disposed on the vehicle as dedicated lamps. In addition, the present invention is not limited to the foregoing embodiments and can be carried out with the configuration of each part altered as required without departing from the spirit of the present invention.

EXPLANATION OF REFERENCE NUMERALS

| | |
|---|---|
| 1 Vehicle | |
| 2 Vehicle body | |
| 3 Headlamp | |
| 6 First communication lamp, | 6a-6c: light emitting segments |
| 7 Second communication lamp, | 7a-7f: light emitting segments |
| 8 Lamp ECU | |
| 9 Vehicle ECU | |
| 10 Communication unit | |
| 11 Probability computing unit | |
| 21 Autonomous driving indication system | |
| 22 Vehicle communication system | |

The invention claimed is:

1. An autonomous driving indication system comprising:
at least two lamps for indicating that a vehicle is autonomously driven, and
a lamp ECU for flashing each lamp,
wherein each lamp is comprised of at least two communication lamps including a first communication lamp and a second communication lamp,
wherein the first communication lamp includes a plurality of light emitting segments linearly arranged in a first direction,
wherein the second communication lamp includes a plurality of light emitting segments linearly arranged in a second direction different from the first direction,
wherein, during flashing, the lamp ECU instantaneously changes a brightness of each lamp while the vehicle is driving, performs control to gradually change the brightness of each lamp with a passage of time while the vehicle is stationary, and, if there is a pedestrian, performs control to flash the first communication lamp and/or the second communication lamp of the lamp on a side closer to the pedestrian.

2. The autonomous driving indication system of claim 1, wherein the lamp ECU moves a location of a flashing segment according to a change in a position of the pedestrian as seen from the vehicle.

3. The autonomous driving indication system of claim 1:
wherein the lamp is comprised of a plurality of light emitting segments, and
wherein the lamp ECU individually flashes the plurality of light emitting segments while the vehicle is driving and controls the brightness of the plurality of light emitting segments in unison while the vehicle is stationary.

4. The autonomous driving indication system of claim 1:
wherein the lamp is comprised of a plurality of light emitting segments,
wherein the lamp ECU individually flashes the plurality of light emitting segments while the vehicle is driving and controls the brightness of the plurality of light emitting segments in unison while the vehicle is stationary, and
wherein the lamp ECU causes the plurality of light emitting segments to flash in a different sequence during acceleration from during deceleration.

5. The autonomous driving indication system of claim 1, wherein the lamp is disposed in a headlamp.

\* \* \* \* \*